United States Patent
Shukla

(10) Patent No.: US 11,363,061 B2
(45) Date of Patent: Jun. 14, 2022

(54) RUNTIME DETECTION OF INJECTION ATTACKS ON WEB APPLICATIONS VIA STATIC AND DYNAMIC ANALYSIS

(71) Applicant: Jayant Shukla, Sierra Madre, CA (US)

(72) Inventor: Jayant Shukla, Sierra Madre, CA (US)

( * ) Notice: Subject to any disclaimer, the term of this patent is extended or adjusted under 35 U.S.C. 154(b) by 127 days.

(21) Appl. No.: 16/926,774

(22) Filed: Jul. 13, 2020

(65) Prior Publication Data

US 2021/0099483 A1 Apr. 1, 2021

Related U.S. Application Data

(60) Provisional application No. 62/875,124, filed on Jul. 17, 2019.

(51) Int. Cl.
*G06F 21/56* (2013.01)
*H04L 9/40* (2022.01)

(52) U.S. Cl.
CPC ........ *H04L 63/1466* (2013.01); *G06F 21/566* (2013.01); *H04L 63/1416* (2013.01); *H04L 63/20* (2013.01)

(58) Field of Classification Search
CPC . H04L 63/1466; H04L 63/1416; H04L 63/20; G06F 21/566
USPC .......................................................... 726/22
See application file for complete search history.

(56) References Cited

U.S. PATENT DOCUMENTS

| | | | | |
|---|---|---|---|---|
| 8,375,458 B2* | 2/2013 | Kiehtreiber | ............. | G06F 21/52 726/30 |
| 8,578,487 B2* | 11/2013 | Soeder | .................. | G06F 21/554 726/1 |
| 8,782,807 B2* | 7/2014 | Kiehtreiber | ............. | G06F 21/52 717/126 |
| 9,245,114 B2* | 1/2016 | Thomas | .................. | G06F 21/55 |
| 2015/0356294 A1* | 12/2015 | Tan | .......................... | G06F 21/53 726/22 |
| 2016/0156658 A1* | 6/2016 | Thomas | ................ | G06F 21/566 726/24 |
| 2016/0180090 A1* | 6/2016 | Dalcher | ................ | G06F 21/566 726/23 |
| 2020/0004963 A1* | 1/2020 | Zheng | ..................... | G06F 21/53 |
| 2020/0311268 A1* | 10/2020 | Kostyushko | .......... | G06F 21/561 |

* cited by examiner

*Primary Examiner* — Teshome Hailu

(57) ABSTRACT

In one aspect, a method for preventing attacks on a web application server by monitoring and validating the API calls executed by the dynamic language code of web application is provided. The method includes the step of scanning the computer system for web applications and the location of dynamic language code or script files used by the web applications. The method includes the step of parsing all script files to identify API calls, the location of API calls, and arguments used in the API calls and storing them as rules.

10 Claims, 11 Drawing Sheets

```
Line 10: String sql = "SELECT username, real_name, test_name FROM users WHERE username = '" + username; 510
Line 11: String sql2 = sql + "'"; 520
Line 12: myInfo = connect.prepareStatement(sql2); 530 resulting sql2 = "SELECT username, real_name, test_name FROM users WHERE username = '" + username + "'" 540 plain-text code is converted to bytecode as following : 550

289: new         #11    // class java/lang/StringBuilder
292: dup
293: invokespecial #12   // Method java/lang/StringBuilder."<init>":()V
296: ldc         #165   // String SELECT username, real_name, test_name FROM users WHERE username = '
298: invokevirtual #14   // Method java/lang/StringBuilder.append:(Ljava/lang/String;)Ljava/lang/StringBuilder;
301: aload       4
303: invokevirtual #14   // Method java/lang/StringBuilder.append:(Ljava/lang/String;)Ljava/lang/StringBuilder;
306: invokevirtual #15   // Method java/lang/StringBuilder.toString:()Ljava/lang/String;
309: astore      15
311: new         #11    // class java/lang/StringBuilder
314: dup
315: invokespecial #12   // Method java/lang/StringBuilder."<init>":()V
318: aload       15
320: invokevirtual #14   // Method java/lang/StringBuilder.append:(Ljava/lang/String;)Ljava/lang/StringBuilder;
323: ldc         #166   // String '
325: invokevirtual #14   // Method java/lang/StringBuilder.append:(Ljava/lang/String;)Ljava/lang/StringBuilder;
328: invokevirtual #15   // Method java/lang/StringBuilder.toString:()Ljava/lang/String;
331: astore      16
333: aload       5
335: aload       16
337: invokeinterface #148, 2 // InterfaceMethod java/sql/Connection.prepareStatement:(Ljava/lang/String;)Ljava/sql/PreparedStatement;
342: astore      7
```

FIGURE 5

| | | |
|---|---|---|
| FRAME 1 810 | FileName: /Users/admin/Desktop/K2/NodeJS/K2-NodeJSAgent/agent.js<br>FunctionName: mod.ChildProcess.spawn && LineNumber: 135 | |
| | FileName: child_process.js<br>FunctionName: spawn && LineNumber: 538 | |
| FRAME 2 820 | FileName: child_process.js<br>FunctionName: execFile && LineNumber: 216 | |
| | FileName: child_process.js<br>FunctionName: exec && LineNumber: 147 | |
| FRAME 3 830 | . . . . . | |
| FRAME 4 | FileName: internal/modules/cjs/loader.js<br>FunctionName: Module.runMain && LineNumber: 760 | |
| . | FileName: internal/bootstrap/node.js<br>FunctionName: startup && LineNumber: 306 | |
| . | FileName: internal/bootstrap/node.js<br>FunctionName: bootstrapNodeJSCore && LineNumber: 878 | |

RUNTIME DETECTION OF INJECTION ATTACKS ON WEB APPLICATIONS VIA STATIC AND DYNAMIC ANALYSIS

CLAIM OF PRIORITY

This application claims priority to provisional patent application No. 62/875,124, titled METHODS AND SYSTEMS OF A RUNTIME DETECTION OF INJECTION ATTACKS ON WEB APPLICATIONS VIA STATIC AND DYNAMIC ANALYSIS, and filed on 17 Jul. 2019. This provisional application is herein incorporated by reference in its entirety.

BACKGROUND

1. Field

This invention relates generally to the field of computer security and relates more particularly to techniques for implementing runtime detection of injection attacks on web applications via static and dynamic analysis.

2. Related Art

Modern web applications can be built using dynamic languages (e.g. PHP, Python, Java, JavaScript, etc.) whose instructions are interpreted at runtime. Interpreters may be easier to develop than compilers. This has enabled the rapid evolution of these dynamic languages to support the high level of sophistication required for building complex web applications. These dynamic languages have made it easy for developers to develop applications, however, new security challenges emerge when dealing with dynamic language code. Dynamic typing, where variable types are checked only at runtime, can result in issues and bugs that can be difficult to track and eradicate. It can also introduce vulnerabilities in web application code that can be exploited to launch attacks and gain unauthorized access.

An important class of vulnerability arises from a mismatch between the type of data that the interpreter is expecting and the data provided by the user; the latter can be created to appear executable to the interpreter, but result in undesirable instructions. For example, in PHP (PHP: Hypertext Preprocessor, a popular open-source scripting language), the eval( ) function is used to evaluate PHP code strings, and unserialize( ) is used to convert user-supplied variables into PHP values. Since these same functions can also lead to execution of system commands, by carefully crafting the input data to the dynamic language code, an attacker can steer the interpreter to remotely execute commands or code on the device that would lead to a compromise. This vulnerability of the unserialize( ) function has, in fact, been used to execute PHP object injection attacks. Similarly, the JSON (JavaScript Object Notation) parser for the Ruby on Rails web-application framework was found to be vulnerable to injection of malicious objects. These types of exploits illustrate a class of weaknesses known as remote code execution (RCE) vulnerability.

SQL injection is perhaps the most common vulnerability in web applications that arises due to dynamic typing of variables. When an input from the user is used in constructing a SQL query that will be interpreted at runtime then, in the absence of strict type checking, it becomes possible for a malicious user to modify the input to lead to execution of queries that were not intended. A common case is when a user-supplied parameter, assumed by the interpreter to be an ordinary single query statement, has instead been engineered to contain a string of concatenated queries. If the input is not verified, then execution of the malicious query can allow the attacker to view or corrupt the target database, and even to escalate privileges to compromise the hosting server.

It is a common practice for web applications to rely on third party components to add new capabilities so as not to have to create them from scratch. Coding deficiencies in those third-party components may result in vulnerabilities that attackers can exploit to exploit the ultimate system.

Several approaches have been developed to detect and prevent attacks on web applications powered by dynamic languages. A most common approach is to use a web-application firewall to block attacks by sanitizing the malicious input that attackers supply to applications to trigger their vulnerabilities. There are, however, several drawbacks to using such a firewall for improving the security of web applications. First, these firewalls are complex. In order to perform effective sanitization, the firewall can have insight into the nature of all application variables. Second, firewalls are always playing catch-up; their effectiveness relies on heuristics derived from knowledge of past attacks. Third, they do not work well out of the box, but require an initial training period to improve their sanitization ability. Fourth, they can be a drag on performance. As its heuristics and definition database sizes increase, a firewall can easily become a bottleneck that leads to latency and scalability issues.

Another approach for protecting web applications is runtime application self-protection (RASP) solutions. These solutions monitor the activities of an application from within at runtime and defend against attacks. They apply a range of validations to the observed activities of the web application to make their judgments. RASP solutions, however, do not use a deterministic method for detecting attacks. They can only make subjective determinations about the validity of behavior, and are prone to error. They may falsely flag valid input while missing true attacks. RASP solutions also impose a significant performance penalty on the web application they are trying to protect. This penalty increases with the size of the reference database and the complexity of the analytics used for attack detection.

From the foregoing it can be seen that a specific need exists for systems and methods that can protect computer systems from attacks that exploit vulnerabilities in dynamic language code. The solution must not take away or limit the capabilities of the software in a manner that could interfere with proper execution of the code. It is also desirable that the solution does not rely too much on heuristics or past information, as doing so imposes fundamental limitations on the efficiency and scalability of the solution. A method that requires neither any prior knowledge about the vulnerabilities in the dynamic language code nor signatures of potential attacks will be more effective compared to methods that rely on analytics and a priori approaches.

Additionally, it is noted that the use of heuristics in preventing exploitation of vulnerabilities in dynamic language code may have intrinsic limitations. Maliciousness is subjective, and there are no a priori settings that can prevent rules or heuristics from inevitably failing to discriminate between legitimate activity and malicious cooption in certain contexts. Additionally, a training sample of good and bad may not be available. Accordingly, improvements that solves this dilemma and provides a method to differentiate between malicious intent and a legitimate activity without requiring any input from the user are desirable.

SUMMARY OF THE INVENTION

In one aspect, a method for preventing attacks on a web application server by monitoring and validating the API calls executed by the dynamic language code of web application is provided. The method includes the step of scanning the computer system for web applications and the location of dynamic language code or script files used by the web applications. The method includes the step of parsing all script files to identify API calls, the location of API calls, and arguments used in the API calls and storing them as rules. The method includes the step of inserting hooks for monitoring incoming requests and API calls executed by the web application server. The method includes the step of inserting validation code that validates the API calls executed by the dynamic language code in a script file by matching them against a rule set for that script file. The method includes the step of generating an event at the time of an API call with information about the API call, arguments used in the API call, parameters of the web request, application stack, and script file responsible for the API call. The validation code checking conformity of the API call's event with the rule set for the script as determined by the mapping. The validation code applies a dynamic validation method if a matching rule is not found. The validation code takes a default action when a rule violation is detected for an event associated with an API call during the execution of the dynamic language code.

In another aspect, a method for generating rules for use in validating application programming interface (API) calls made by dynamic language code in a script file based on the analysis of the script file is provided. The method includes the step of scanning the script file for the signatures of API calls to be monitored. The method includes the step of logging the location and name of the API calls. The method includes the step of obtaining the argument names used in the API call. The method includes the step of building a parse tree for the script file and use a tree parser to determine the value of arguments used in the API call. The method includes the step of creating a rule specifying name of the API call, cryptographic hash of the script file, location of the API call, and arguments used in the API. The method includes the step of storing the rule list in a database along with the attributes of the script file containing the dynamic language code.

BRIEF DESCRIPTION OF THE DRAWINGS

Various embodiments described herein are illustrated by way of example, and not by way of limitation, in the figures of the accompanying drawings, in which:

FIG. 5 shows the method used for parsing a dynamic language code file to obtain the value of arguments used in invoking API calls, according to some embodiments.

FIG. 8 is a generalized diagram for frames on the application stack at the time of an API call, according to some embodiments.

Figure 1:
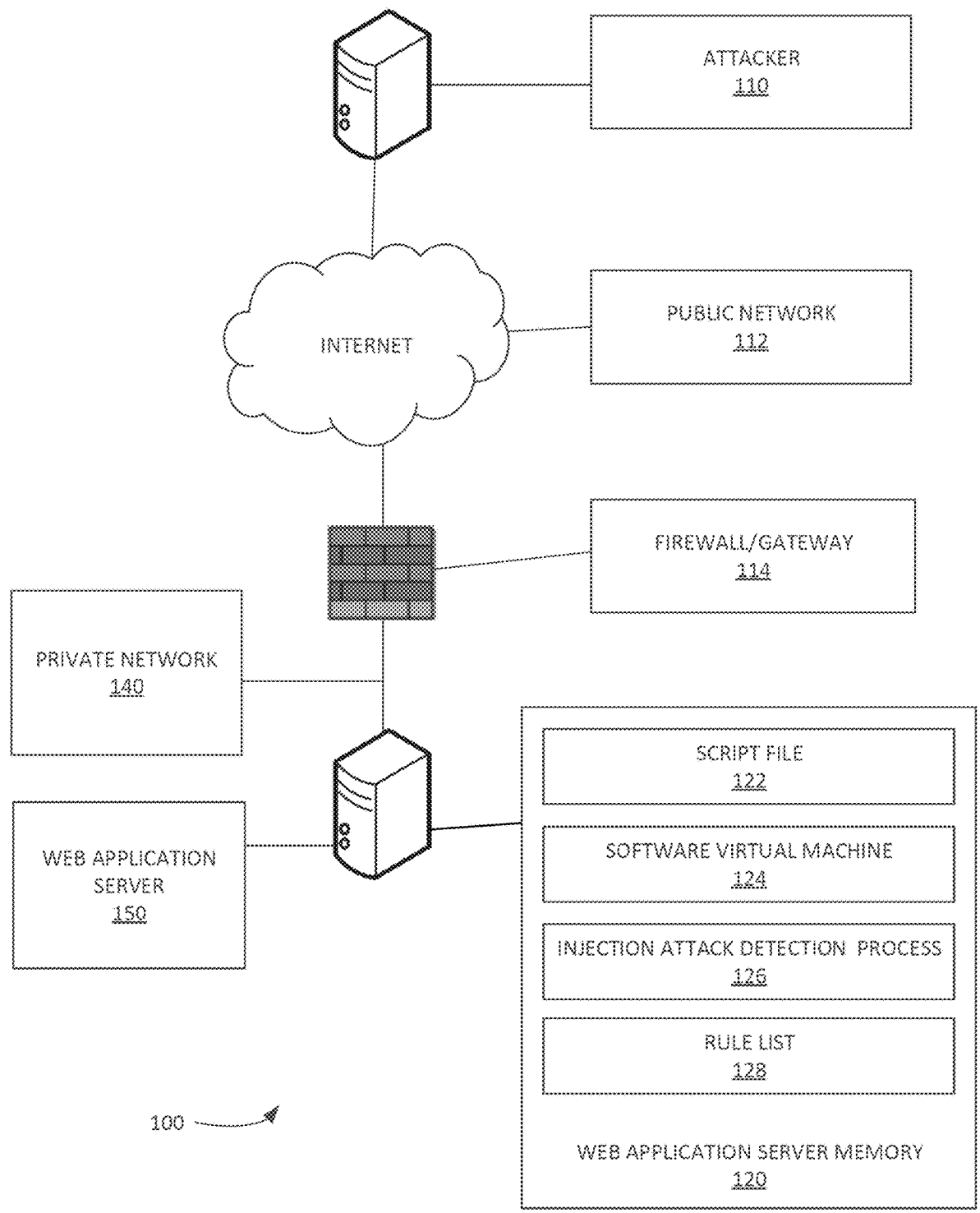
FIG. 1 illustrates a block diagram of a computer network system that represents one or more embodiments.

It will be recognized that some or all the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

Disclosed are a system, method, and article of method of runtime detection of injection attacks on web applications via static and dynamic analysis. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application Programming Interface (API) is a set of subroutine definitions, protocols and tools for building application software. An API can be a set of clearly defined methods of communication between various software components.

Blacklisting is the action of a group or authority, compiling a blacklist of people, countries, or other entities to be avoided or distrusted as not being acceptable to those making the list.

Containers are a means of isolating processes where virtualization takes place within the operating system (OS) rather than at the hardware. Containerization makes it easy to deploy and run applications in different environments without having to worry about the impact of the runtime environment on the functioning of the containerized application, and vice versa. Containerization offers the advantages of virtualization while avoiding the overhead of having to replicate an entire operating system for each target application. In contrast with virtual machines, containers can be configured and started in seconds or minutes.

Dynamic Linked Library (DLL) is an example implementation of the shared library concept in an operating system.

Hooking can be used to alter or augment the behavior of an operating system, of applications, or of other software components by intercepting function calls or messages or events passed between software components.

Seccomp (secure computing mode) is a computer security facility in the Linux kernel. Seccomp allows a process to make a one-way transition into a "secure" state where it cannot make any system calls except exit( ), sigreturn( ), read( ) and write( ) to already-open file descriptors. Should it attempt any other system calls, the kernel can terminate the process with SIGKILL or SIGSYS.

Whitelisting is the practice of explicitly allowing some identified entities access to a particular privilege, service, mobility, access, or recognition.

EXAMPLE EMBODIMENTS

Example systems and methods can be used for preventing malicious attacks on web applications. In particular, the example systems and methods include novel means for determining that a malicious actor is able to modify the behavior of a web application by manipulating input.

Example systems and methods can be used to protect web applications from the class of cyber-attacks that exploit vulnerabilities in dynamic language code to gain unauthorized access. It is noted that example reasons for these vulnerabilities can be improper validation of user-provided input that results in execution of unauthorized APIs by the application. When input from the user is used to supply a parameter value to a function interpreted at runtime, without validation it may be possible for an attacker to modify that input to cause execution of unintended instructions. This entry point allows an attacker to launch a variety of attacks on the application such as SQL injection, data leak, remote code execution, etc.

A method and system are provided for a technique for deterministically validating API function calls to prevent attacks on web applications resulting from improper handling of inputs. By applying static and dynamic analysis to isolate the characteristics of API function calls to precise locations in dynamic language code files or script files and validating user input, the possibility of attacks can be effectively eliminated. The deterministic approach for validating the API function calls ensures that user input is not a factor, and without having to require examples of good and bad API calls for training, it becomes possible to detect attacks on web applications without creating false positives. Example systems and methods can overcome the challenges unanswered by traditional runtime application protection methods, which only view the application in its entirety and rely on heuristics, analytics, and rules for detecting attacks.

Example systems and methods can implement the insight that an attack that exploits vulnerabilities arising in the execution of dynamic language code can be successful if the attacker is able to execute privileged instructions, system calls, and API calls (e.g. collectively referred to as API calls herein). When a vulnerability in the dynamic language code is being exploited, then by definition, the API call execution pattern can change. Example systems and methods can detect changes in the API call pattern arising from malicious user input and blocks the attack by vetting actual API calls against those predicted by analysis of the application.

Example systems and methods can scan the dynamic language code in a file for API calls. A list of API calls and their locations in the script file is created. Software hooks can be placed for monitoring API calls during execution of the dynamic language code. The execution of the dynamic language code is monitored. During the execution of the dynamic language code the effect of user input leading to changes in API call or arguments the API call is detected. Any changes to the API call are validated against the whitelist of API calls for that dynamic language code file and location. The prescribed action is taken if the observed API call is not in accordance with the list; an event is logged.

In another embodiment, example systems and methods can scan dynamic language code in a file for API calls; a list of API calls and their locations in the script file is created. Software hooks are placed for monitoring API calls during execution of the dynamic language code. The execution of the dynamic language code is monitored. The association is made between observed API calls and the dynamic language code. During the execution of the dynamic language code the effect of user input on the arguments to API calls is detected; the arguments to API calls are tokenized and rules created. During the execution of the dynamic language code the effect of user input on the arguments to API calls is negated; the observed API calls are validated against the whitelist of API calls for that dynamic language code file. The prescribed action is taken when an observed API call is not in accordance with the list; an event is logged.

In another embodiment, example systems and methods can monitor the execution of dynamic language code to generate the rule list (e.g. rule list 128). Software hooks are placed for monitoring API calls during dynamic language code execution. During the execution of the dynamic language code the type and location of API calls are recorded, and a rule list is generated.

In another embodiment, example systems and methods can implement a secondary validation. The secondary validation can provide the ability to resolve ambiguities and flag true attack events. To perform the secondary test, upon receipt of an event, the corresponding dynamic language code file is scanned. A list of all instructions is generated. A list of all API calls is generated. The received event is matched with the dynamic language code at the locations that are consistent with known instructions and API calls. When the type of API call is not consistent with the information extracted from the dynamic language code, the event is deemed invalid. When the event is an API call (e.g. not another kind of privileged instruction), two additional checks can be made.

In yet another example, a computer system is scanned for web applications, script files associated with the web application are detected. Script files are analyzed for API calls. A rule list (e.g. rule list 128 discussed infra) is generated for each script file. A web application execution is monitored. The association between web requests and script files is made. The observed API calls are matched against the known rule list for the given web request. It is noted that the rule list include the list of API calls and their precise location in the script file.

It is noted that benefit of using authentication of API calls executed by dynamic language code for preventing cyber-attacks is that the solution can be deterministic and does not rely on the user to configure any rules or heuristics. Example systems and methods can provide the ability to detect and block the majority of cyber-attacks before any harmful malicious instructions are executed. The task of generating a list of rules for controlling the API calls executed by dynamic language code can be simple and deterministic. It can be automated much more efficiently compared to the task of generating a list of attack signatures.

Example systems and methods can use of a deterministic method, rather than a reliance on heuristics, to achieve very precise regulation of API calls, instead of requiring a user to use past experience to configure arbitrary a priori rules, example systems and methods can use information about the internal structure of each dynamic language code file to create deterministic rules, and then enforce them for that specific file during the execution of the code. Secondly, example systems and methods can associate API calls to specific files to greatly reduce the attack surface without adversely impacting the functionality of the application server in any manner.

Example methods and systems can provide a deterministic method for detecting such input and neutralizing it. Rather than requiring models of good and bad behavior to characterize the validity of arguments, the example methods and systems can automatically generate validation rules through static and dynamic analysis. The former can be based on analysis of the dynamic language file; the latter can be based on controlled monitoring of observed API calls and associated user input. The two techniques together can provide a comprehensive method for detecting exploit attempts.

The seccomp security feature of the Linux kernel can be used to implement whitelisting and blacklisting solutions for compiled code by providing a native mechanism to restrict system API calls by type for any given application. Unfortunately, although these solutions could be useful in this context, there is no extant similar capability when an application includes the execution of dynamic language code. Example methods and systems can extend seccomp-like capabilities to individual dynamic language code files or script files so they can be secured against vulnerabilities. Example methods and systems can secure dynamic language code in its ability to detect and block almost every category of zero-day exploit without relying on signatures of past attacks. Further, example methods and systems can require modification of the dynamic language code.

EXAMPLE SYSTEMS

Example runtime-detection systems can be used to protect web applications from the class of cyber-attacks that exploit vulnerabilities in dynamic language code to gain unauthorized access. Example runtime-detection systems can deterministically validate API calls to prevent attacks on web applications resulting from improper handling of inputs. Example runtime-detections systems overcome challenges faced by traditional runtime application protection methods that only view the application in its entirety and rely on heuristics, analytics, and rules for detection attacks. By applying static and dynamic analysis to isolate the characteristics of API function calls to precise locations in dynamic language code files or script files and validating user input the possibility of attacks can be effectively eliminated. This deterministic approach for validating the API function call ensures that user input to the call is not a factor, and not having to require examples of good and bad API calls for training, is able to detect attacks on web applications without creating false positives. Example runtime-detection systems provide a method to differentiate between malicious intent and legitimate activity without requiring any parameter setting or other effort from the user.

Example runtime-detection systems can implement the insight that an attack that exploits a vulnerability in the dynamic language code can be successful only if the attacker is able to execute privileged instructions, system calls, and API calls. These are collectively referred to as API calls from here on, if a vulnerability in the dynamic language code is exploited, then by definition, the API call execution pattern will change. Example runtime-detection systems can detect changes in API call patterns arising from malicious user input and block attacks by vetting actual API calls against those predicted by the analysis of the application.

Example runtime-detection methods can scan dynamic language code in a file for API calls. A list of API calls and their locations in the script file is created. Software hooks are placed for monitoring API calls during the execution of dynamic language code. Execution of dynamic language code is monitored. During the execution of dynamic language code user input that would lead to changes in API calls or arguments of API calls is detected, and its effects countered. Any changes to the API calls are validated against the whitelist of API calls for that dynamic language code file and their location in the file. Prescribed action is taken if the observed API call is not in accordance with the list. An event is logged.

Example runtime-detection methods can scan the dynamic language code in a file for API calls. A list of API calls and their locations in the script file is created. Software hooks are placed for monitoring API calls during the execution of the dynamic language code. Execution of the dynamic language code is monitored. An association is made between the observed API calls and the dynamic language code. During the execution of the dynamic language code the presence of malicious input is detected and its influence on API calls negated: the arguments to API calls are tokenized and rules created; detected user input is replaced by a token; during the execution of the dynamic language code, the effect of user input on the arguments to API calls is neutralized; prescribed action is taken if an observed API call is not in accordance with the whitelist; an event is logged.

Example runtime-detection methods can monitor the execution of dynamic language code to generate a rule list. Software hooks are placed for monitoring API calls invoked during the execution of dynamic language code. During the execution of dynamic language code, the type and location of API calls are recorded. A rule list is generated.

Example runtime-detection methods can implement a secondary validation. Secondary testing can play a role in the ability of some embodiments to resolve ambiguities and flag true attack events only. To perform secondary validation upon the receipt of an event, the corresponding dynamic language code file is scanned. A list of all instructions is generated. A list of all API calls is generated. The received events are matched with the dynamic language code at locations that are consistent with known instructions and API calls. If the type of API call is not consistent with the information extracted from the dynamic language code, the event is deemed invalid. If the event is an API call, two additional checks are made.

Example runtime-detection methods can scan a computer system for web applications. Script files associated with a web application are detected. Script files are analyzed for API calls. A rule list containing all API calls and their precise location in the script is generated for each script file. Web application execution is monitored. Association between web requests and the script file serving the web requests is made. Observed API calls are matched against the rule list for the relevant script file. Example runtime-detection methods can provide the ability to detect and block the majority of cyber-attacks before any harmful or malicious instructions can be executed. Traditional subjective methods based on scanning content or analyzing the behavior of applications executing dynamic language code may suffer from false positives and will miss a significant number of attacks. In contrast, the task of generating a list of rules for controlling the API calls executed by dynamic language code is simple and deterministic. Authentication of API calls therefore does not rely on the user to configure any rules or heuristics. It can be automated much more efficiently compared to the task of generating a list of attack signatures.

Example embodiments implement the insight that attacks that exploit vulnerabilities in the execution of dynamic language code of a web application can only be successful if the attacker is able to either after API calls made by the dynamic language code or make entirely new API calls by manipulating input provided to the web application. Some examples of API calls, though these are not exhaustive, are write( ) read( ), system( ), ProcessBuilder.command( ), Runtime.exe( ) and executeQuery( ). A typical attack would be to change the executeQuery( ) API to also execute system( ) API or to change the parameters used in executeQuery( ) API to alter the database. While dynamic language code can exhibit variations in the API calls it invokes, a change to the intended execution of an API call will reveal itself as inconsistent with the original calling location of the API call in the dynamic language code file or script file. Therefore, validating the observed API calls based on the information from the script file provides a deterministic way for detecting attacks. During the execution of a web application, API calls are monitored and validated. If a vulnerability in the dynamic language code is exploited, then by definition, the API call execution pattern will change, and the method will detect the attack. For example, a successful SQL injection attack typically leads to execution of additional database commands for reading data from, changing existing data within, or inserting new data into the database. It is noted that statically and/or dynamically generated rules are used to detect changes to the API's call compared to what they should be for any specific location in the dynamic language script file responsible for invoking the API call.

In one embodiment of the present invention, API calls invoked by the web application are monitored and traced to a specific dynamic language code file and validated by means of a rule list for that file. If a vulnerability in the dynamic language code is being exploited, then by definition, the API call execution pattern change, and the method will detect the attack. Authentication of the execution of dynamic language code is accomplished by collecting events for observed API calls executed by the web application and validating them in a separate process. The system is scanned for dynamic language files and a rule list is generated for each dynamic language file. The validation of collected events is achieved by matching each observed event to a known rule for the dynamic language file. If a rule is not present, then a dynamic validations method is applied to generate a rule from the API call and user inputs and the API call is validated against that rule. If the API call does not match any rule, it is flagged as an attack.

In another embodiment of the present invention, authentication of the execution of dynamic language code is accomplished by collecting events for observed API calls invoked by the web application and validating them as described in the previous paragraph. If the event is not validated a default action is taken.

In yet another embodiment of the present invention, detection of attacks via authentication of dynamic language code execution is accomplished by collecting events for observed API calls from the web application, transmitting the collected information to a remote server or service and validating the collected event at the remote server or service. If the result of validation indicates an attack, an incident is recorded.

In one embodiment of the present invention, authentication of dynamic language code execution is accomplished by observing its action from a more highly-privileged process. No modifications to the dynamic language code being protected are necessary.

In another embodiment of the present invention, authentication of the dynamic language code execution is accomplished via dynamic or static instrumentation of the code executing in the memory of the client computing device.

FIG. 1 illustrates a block diagram of a computer network system 100, according to some embodiments. One or more networked web application servers 150 can be accessed through private networks 140. Vulnerabilities in the script files that are part of the web application can be targeted by attackers to gain unauthorized access. Any one of the computers can be an attacker computing device 110, and its identity and intentions may not be known. The private network 140 between the application servers may include a range of components such as routers, switches, firewalls, content filters, proxies and other hardware that route the data transmitted between the application servers. The network between the application servers can be a public network 112 or a private network 140 or a combination thereof. The web application servers 150 are computing devices such as a server, virtual machine, personal computer, notebook computer, smart phone, or the like. While the illustration 100 depicts only one web application server, one policy server, and one attacker, other embodiments of the computer network system may contain multiple instances of each.

For the embodiment illustrated in FIG. 1, system 100 includes a web application server 150 that executes a set of script files 122 whose vulnerabilities could be targeted and exploited by the attacker 110. The script files contain code that is interpreted and executed at run time by a software virtual machine or interpreter 124 in the web application server. In the memory 120 of the web application server 150 there executes an injection attack detection process 125 whose role is to detect and prevent any attempts to exploit vulnerabilities in the dynamic language code executing on the web application server 150 by monitoring and validating API calls executed by said dynamic language code in the script file 122. The validation process can be implemented as a service, application, DLL (dynamic-link library), kernel module, or hypervisor.

The validation process monitors the set of dynamic language code in the script files executing in the memory 120 of the client; scans script files to generate an API rule list 128; API calls are monitored; API calls are validated using a rule list 128 for each set of code; if rules don't match then dynamic validation is applied; default action is taken when a violation is detected.

Figure 2:
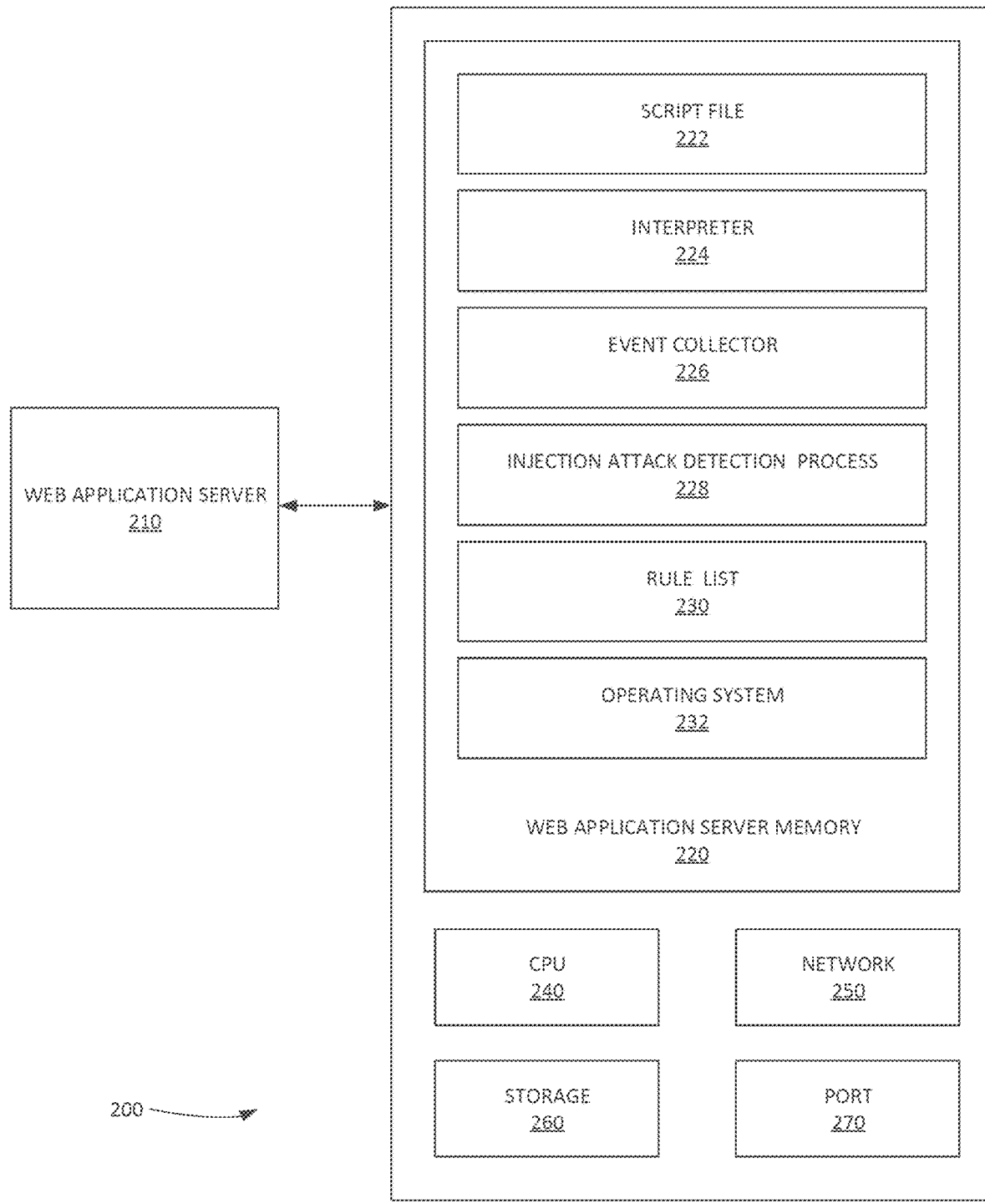
FIG. 2 is an illustration of an example system, according to some embodiments.

FIG. 2 is an illustration of another embodiment of the present invention. For simplicity of illustration the monitoring, rule generation, and validation steps are applied at the same computing device. The system 200 includes an application server 210 that executes a set of script files 222 containing dynamic language code. In the memory 220 of the application server 210 executes an injection attack detection process 228, whose role is to monitor API calls executed by dynamic language code and to enforce rules. The execution of the dynamic language code is done by an interpreter 224, and the collection of events for validation of the observed API calls made by the dynamic language code is done by the event collector 225. The validator process can be implemented as an application, kernel module, hypervisor, or a DLL. The validator process monitors the set of scripts executing in the memory 220 of the application server; API calls are monitored and events are collected for API validation; a rule list 230 is generated; and, using the rule list 230, the application is protected against attacks attempting to exploit vulnerabilities in the dynamic language code; default action is taken when a violation is detected. In accordance with one aspect of the present embodiment the monitoring, validation, and enforcement of API calls made by the dynamic language code in script files are all part of a single validator process. In accordance with another aspect of the present embodiment, monitoring, validation, and enforcement of API calls made by the dynamic language code in script files can be separate processes. In accordance with yet another aspect of the present embodiment, the observed API calls executed by the dynamic language code in the script file at the computing device 150 are reported to the rule server 160, where the rule set is applied to detect violations.

The computing system 210 may incorporate additional components including, but not limited to, central processing units (CPU) 240, storage devices 260, network devices 250, and input/output ports 270. While the computing system depicted here has been illustrated with a single CPU, storage device, network device, and input/output port, it should be apparent to anyone skilled in the art that the present invention can be implemented through many different configurations of the computing system and may incorporate more than one of the individual components. The computer system may, further, include read-only memory (ROM), compact disk ROM (CD-ROM), random-access memory (RAM), erasable programmable read-only memory (EPROM), storage area network (SAN), or other storage media that can be accessed by the computing system (e.g. web application server 210, etc.).

Figure 3:
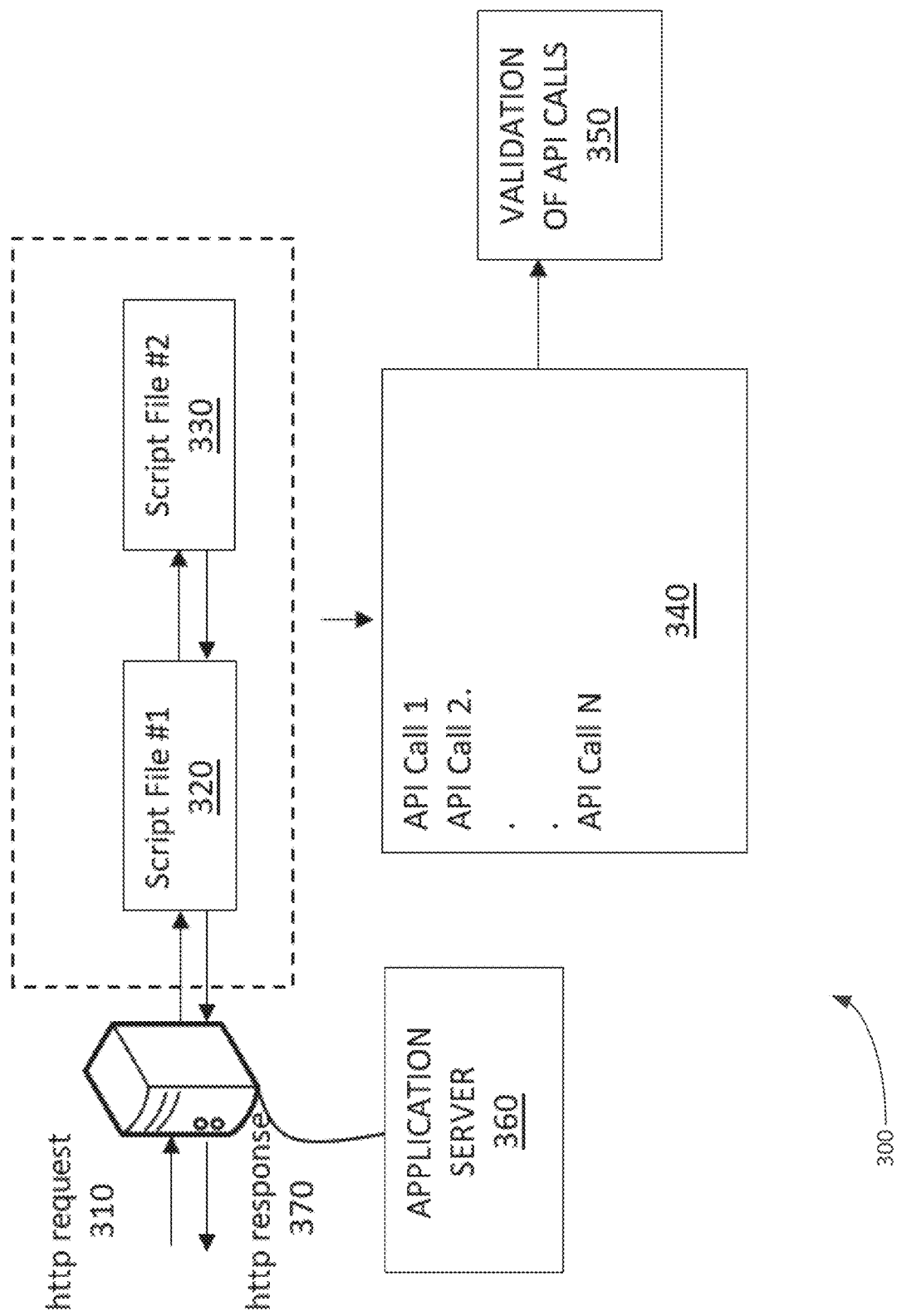
FIG. 3 illustrates the processing of an incoming network connection to a web application server and the resulting API calls to detect an attack, according to some embodiments.

FIG. 3 illustrates the processing of an incoming network connection 310 to a web application server 360 and the resulting API calls 340 to detect an attack, according to some embodiments. An incoming http connection 310 to the web-application server 360 gets mapped to its respective dynamic language code files or script files 320 330. The execution of script files 320 330 results in API calls 340. Normal execution of a script file will result in a specific API call list pattern. API calls made by the web application server 360 are validated 350 to ensure that any incorrect handling of the user input, which is part of the http request 310, has not resulted in attack via unauthorized API calls. When a vulnerability in the code of the script files 320 330 is exploited, however, the pattern of the API calls executed by the script files 320 330 will change. Validation of API calls 350 detects this change and makes it possible to detect and prevent the exploitation of vulnerabilities in the script files. Enforcing rules for API calls executed by individual script files offers a tremendous improvement in detecting attacks over monitoring the overall behavior of the application server, where the combined activity of multiple scripts can easily overlap with actions that might be taken by the attacker.

Figure 4:
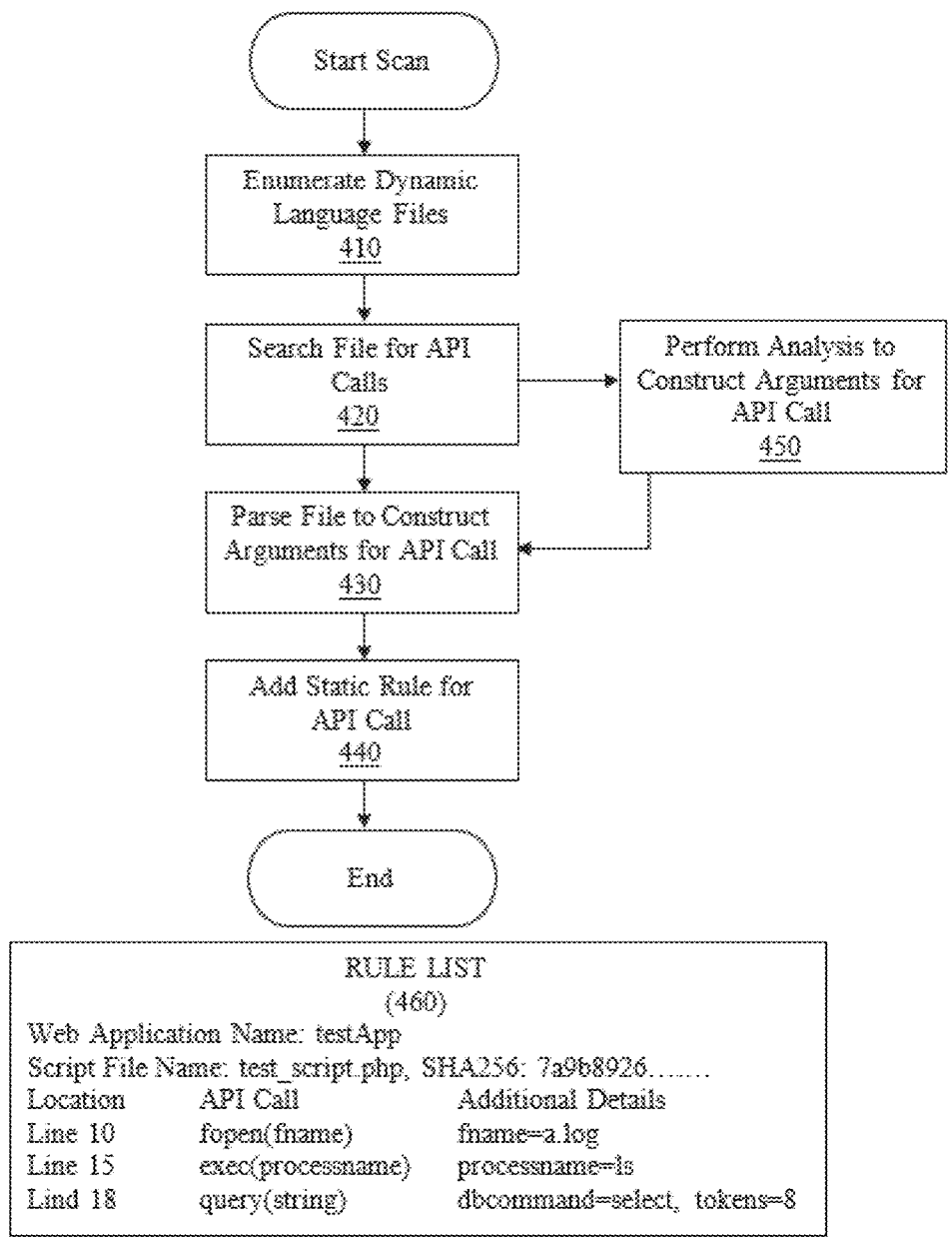
FIG. 4 is a control flow chart that illustrates the process for the analysis of dynamic language code in script files that are part of a web application, to generate a rule set to be used in the validation of invoked API calls by that web application, according to some embodiments.

FIG. 4 is a flow chart 400 that illustrates the process for the analysis of dynamic language code in script files that are part of a web application to generate a rule set to be used in the validation of invoked API calls by that web application. The first step in building a rule list is the enumeration of dynamic language files 410 that are part of the web application. The name and location of the web application on the computing device or the container is detected. The computer system is scanned to detect dynamic language files that are part of that web application 410. The web application may be executing as a daemon on the computing device or inside a container. The dynamic language code in every file is statically analyzed 420 to generate a list of API calls that can be executed by that dynamic language file. This list is obtained through lexical analysis of the original text of the dynamic language code and bytecode analysis of the generated byte code. The code in the dynamic language file is parsed to construct arguments used in the API call 430. The value of the arguments used in the API calls is determined by building a parse tree for the script file and using a tree parser to determine updates to the arguments used in the API call. A static rule is added for each API call detected to generate a rule list 440 for the dynamic language file. When static analysis fails to obtain the varies to the arguments to the API call, dynamic analysis of the script file is performed by executing it in a controlled environment and recording the API calls made 450. The dynamic analysis can be based on collected and validated events for that API call as described in FIG. 6 and FIG. 7. The rule list 460 for a dynamic language file consists of the dynamic language file name, a cryptographic hash of the file, and a list of all API calls detected in the file along with the location or line number for each API call and its associated arguments. The rule list can be stored locally and also sent to a remote rule server.

Since the impact of an API call misuse by an attack depends not only on the type of API call, but also on the arguments used in the call, it is desirable to include the value of arguments used in an API call as part of a rule. Due to the limitations of static analysis methods, it is not always possible to find the arguments for API calls from static analysis. In such cases, our instrumentation allow us to derive the arguments from the dynamic language code. FIG. 5 shows a method for parsing a dynamic language code file to obtain the value of arguments used in invoking API calls that is consistent with an embodiment of the present invention. The dynamic language code file is parsed to construct the arguments used in the API call. To obtain the value of the arguments used in the API calls, a parse tree is built for the script file and a tree parser is used to determine updates to the arguments used in the API call. The dynamic language files can either contain code in plain text or bytecode form. The list of API calls for that script file is obtained via either lexical analysis or byte code analysis coupled with abstract syntax tree (AST) parsing to detect transformation of the parameters used in the API call. The API call 530 uses sql2 string as argument. The sql2 string is constructed using sql string 510 and a string concatenation operation 520. The parsing of the file followed by AST analysis are used to determine the value of the argument sql2 supplied to the API call 540. In cases where static semantic analysis of human-readable code fails to detect API call arguments correctly, the analysis can also be performed on bytecode that is executed by the interpreter 550. The generated bytecode is analyzed for API calls, dramatically reducing missed detections. Instructions in the bytecode from lines 289-309 construct sql string and instructions of lines 311-331 construct sql2 string. The API call prepareStatement( ) is invoked via instructions lines 333-342. The type and location of the API calls in the bytecode are recorded along with the values of arguments used in the API call.

Figure 6:
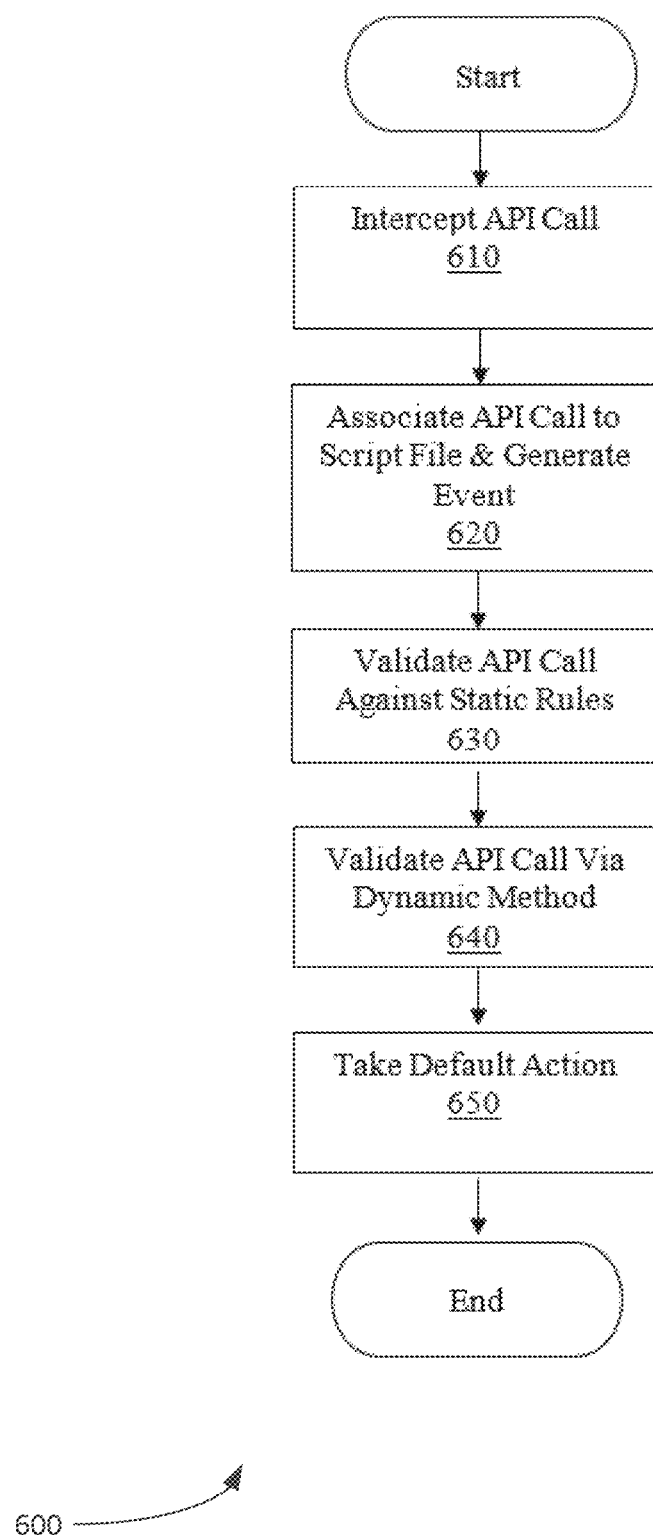
FIG. 6 is a flowchart that illustrates steps performed for validation of an API call executed by the dynamic language code in a script file as part of serving a web request, according to some embodiments.

FIG. 6 is a flowchart 600 which illustrates steps performed for validating an API call executed by the dynamic language code in a script file, as part of serving a web request, according to some. In order to detect whether an invoked API call was the result of an attack on the web application and take appropriate corrective action, that API call must be validated to ensure that it is consistent with the dynamic language code file or script file that invoked it. The first step in the validation of an API call 610 is intercepting the AP call and capturing any additional information required for validating the API call n the form of an event. The generated event is validated to detect attacks. In order to validate a collected event and differentiate it from one arising from an attack, it is necessary to correctly associate an incoming request with the script file whose execution invoked the target API call. For that purpose, the system is scanned to find script files as well as settings that map incoming web connections to script files. As part of the initialization process, monitoring and validation hooks are placed that may be either system-wide or specific to each script. These hooks allow association of an API call to the script file that executes the API call 620. The association between API call and script file can be made either from the runtime stack or by monitoring incoming web requests and associating them to the script file they execute. At the time of an API call, an event is generated with the information required for validating the API call and is sent to a validator process. The validator process uses static as well as dynamically-generated rules to validate the event 630 640. Based on the validation of the event a default action is taken 650. The default action could be permitting the API call, when the event passes validation, or denying the API call when the event fails validation. The default action could be to log the event indicating presence of an attack.

Figure 7:
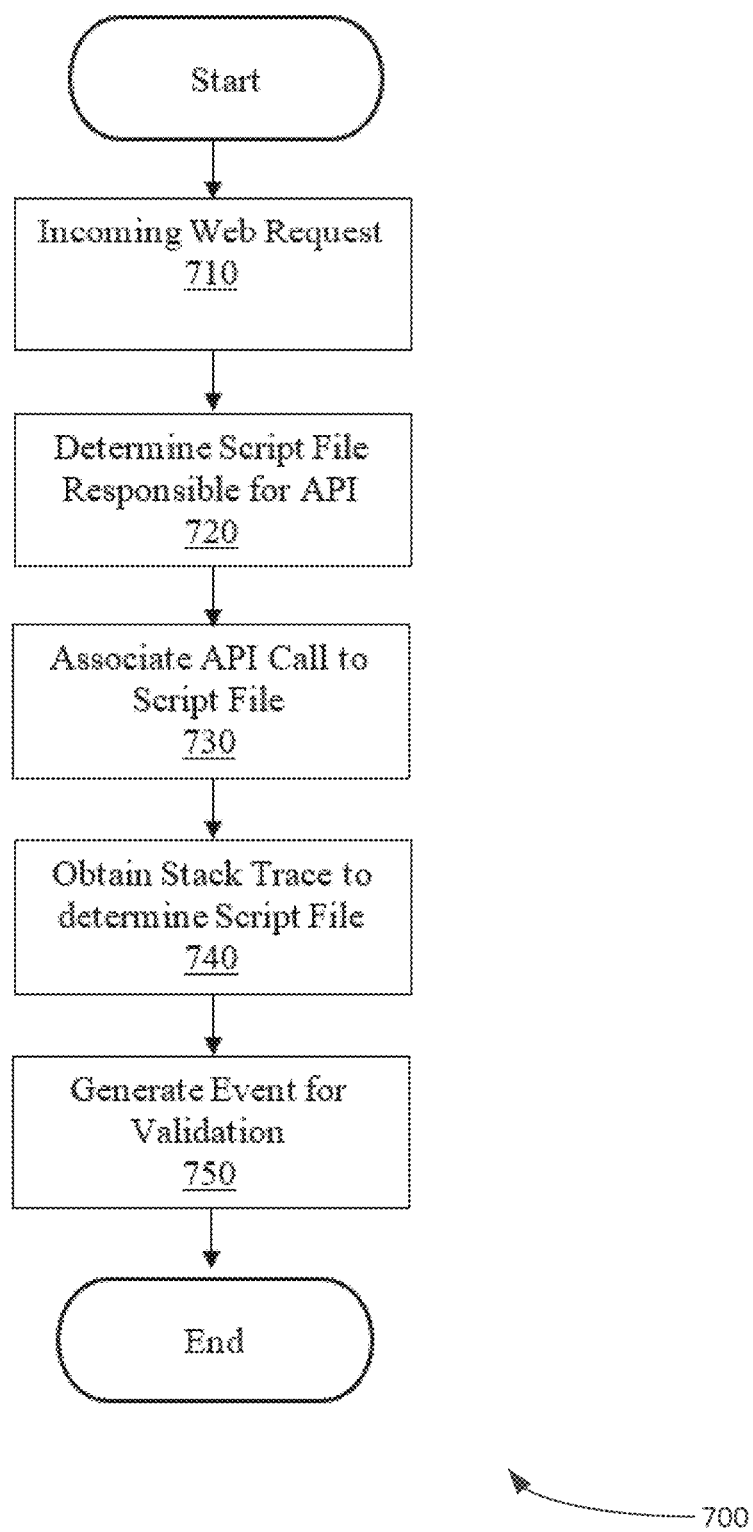
FIG. 7 is a flowchart for making an association between an observed API call and the dynamic language code file responsible for invoking that API call and generating an event for validating the observed API call, according to some embodiments.

FIG. 7 is a flowchart for making an association between an observed API call and the dynamic language code file responsible for invoking that API call and generating an event for validating the observed API call. The validation of an observed API call event requires that a rule list for each script file responsible for invoking the API call be loaded by the validator process. A mechanism to detect the execution of a specific script responsible for an observed API call is installed. The event collection mechanism establishes an association between the observed API call and the dynamic language code file responsible for invoking the API call.

One example of such a mechanism is to monitor incoming network connections 710 to detect the serving of a new http request by a web server, and associating that request with the dynamic language code file or script file that will serve that request 720. The mapping between the incoming request and the corresponding script file can be obtained from the configuration of the web application server. For example, for the Apache web server, the mapping could be obtained from the .htaccess (Hypertext Access) configuration file, which prescribes script files for handling incoming web requests. The system is monitored to obtain the identity of the process or worker thread responsible for processing the incoming http request. API calls made by the process or the worker thread are monitored 730; all the API calls made by that process or worker thread until the completion of that http request can be assigned to the same script file. An event is generated 750 for each API call. The events generated by the script file are recorded and loaded into the memory of the injection attack detection process for validation. The script files are identified based on their hashes. The injection attack detection process validates these events to determine if they arise from the normal serving of the web request or due to an attack that was part of the web request.

An even more robust method for establishing the association between an API call and its dynamic language code file is using the stack trace at the time of the API call. This approach also has the advantage that the association does not have to be made at runtime and can be completed at the time of validation of an event. For details, see the next figure. The stack trace at the time of API call 740 is obtained; stack frames in the stack trace are sequentially unwound; stack frames are associated with dynamic language code files; the stack frame responsible for invoking the API is detected.

FIG. 8 is a generalized diagram for frames on the application stack at the time of API, according to some embodiments. The stack shows all the frames at the time of execution of command ['/bin/sh-c pwd'] by the Web application. The application frames reside at the top of the stack, followed by the extension class frames. At the bottom of the stack are bootstrap class frames that are responsible for starting the application. The stack 800 for the web application was extracted at the time of the ChildProcess.spawn API call. The stack 800 shows that FRAME 1 810 is responsible for invoking the mod.ChildProcess.spawn API call at line 135 of the dynamic language file "/users/admin/Desktop/k2/NodeJS/K2-NodeJSAgent/agent.js". In this way, stack analysis provides a deterministic method for making an association between the observed API call and the dynamic language file responsible for invoking it.

Figure 9:
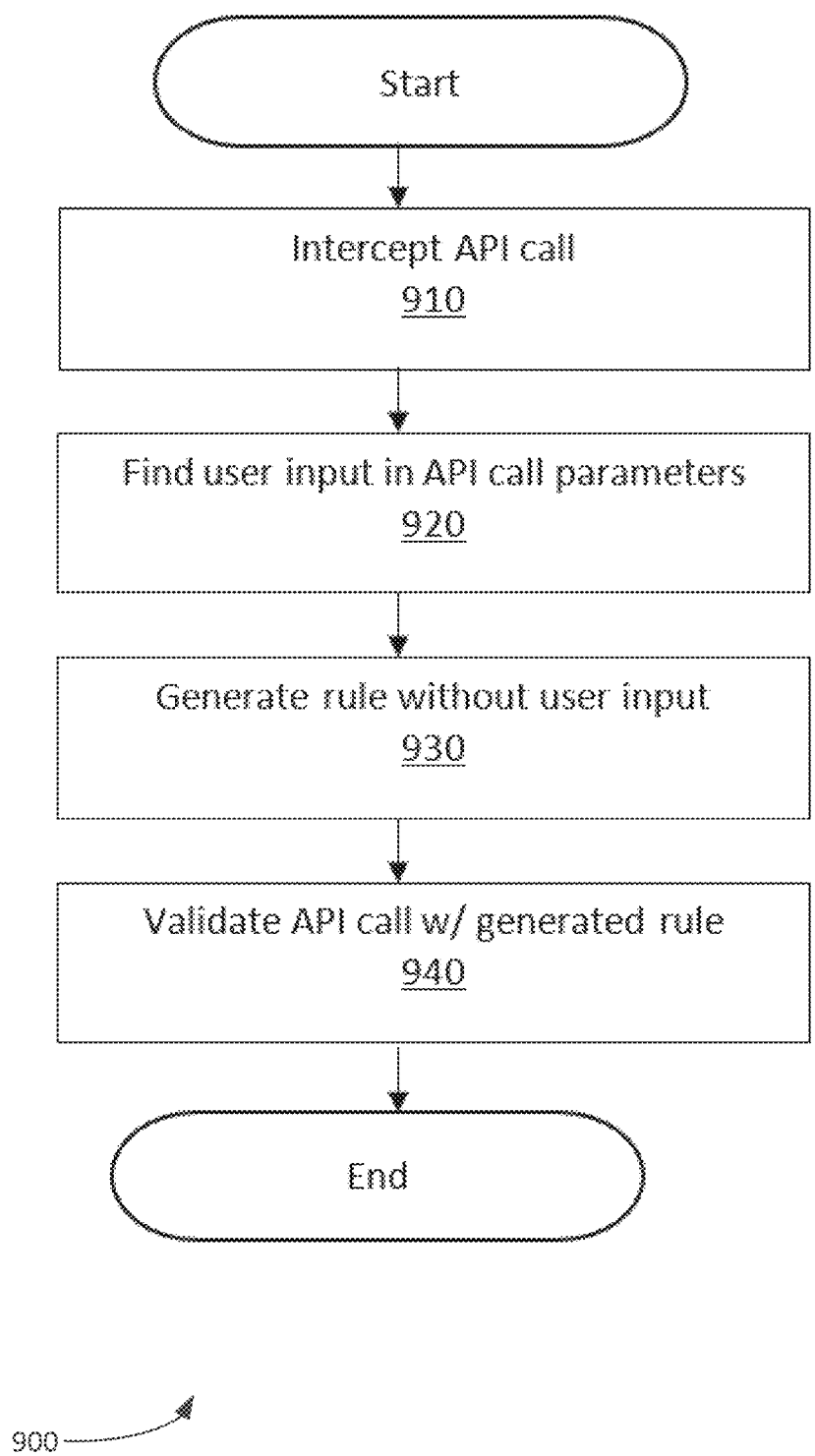
FIG. 9 illustrates a flow chart for a dynamic validation method, according to some embodiments.

FIG. 9 illustrates a flow chart for a dynamic validation method that is consistent with one embodiment of the present invention. Because a static analysis method for detecting API calls in a dynamic language code file can never be complete, reliance on such a method alone could result in fake positives or missed detection of attack. The dynamic validation method enables the validation of API calls that static analysis world have missed and where and a corresponding validation rule would be lacking. The mechanism used in dynamic analysis is to remove the effect of any user input to the API call to create rules that are free from influence by any attack. The user input may be received through a form, JSON, XML document, etc. It is then interpreted by the web application and can subsequently be used in the invocation of the API calls. The first step 910 of the dynamic analysis method is to intercept the API call. Step A 912 shows an example of a database-query API call that is in reality an injection attack on the SQL SELECT command to be executed at line 18 of file test.php. The second step 920 takes the parameters under the control of the attacker and negates them from the API call arguments. Step B 922 shows the example of matching "x" in the query and "y" OR 1=1". A tokenized version of the query is constructed. The third step 930 is creating a rule based on the syntax of SELECT. In step C 932, the tokenized version of the API call has been used to create a rule for validating events, in this case specifying that there should be eight tokens presented for the DB SELECT command at line 18 of the test.php file. The final step is using the generated rule to validate the event 940. Based on this rule, the event validation fails, as there are 10 tokens in the query compared to the eight that were expected.

As shown in FIG. 6, the observed API calls are matched against the rule set for the script file 620 and then validated using the dynamic method. If a rule is violated, an event is logged and the default action is performed 650, otherwise the program continues its normal execution and continues monitoring new requests 610. While the event can be validated locally at the web application server, the event may also be reported to a remote rule server, which further analyzes the event to determine if the event represents a real attack or merely an incompleteness of the rule list for that script. When the cause for the event is an incomplete rule set, an update is sent to the web application server from the rule server. In the case where the event has resulted from a potential attack, the rule server may send instructions that include, but are not limited to, stopping the execution of the script, and terminating the network connection responsible for the event. The events for API calls can also be used in monitoring mode to generate a rule list. In monitoring mode, upon encountering an API call, a rule is created based on the parameters collected from the event. This monitoring mode is a means of performing the dynamic analysis to construct rules for observed API calls 450 mentioned in the discussion of FIG. 4.

Figure 10:
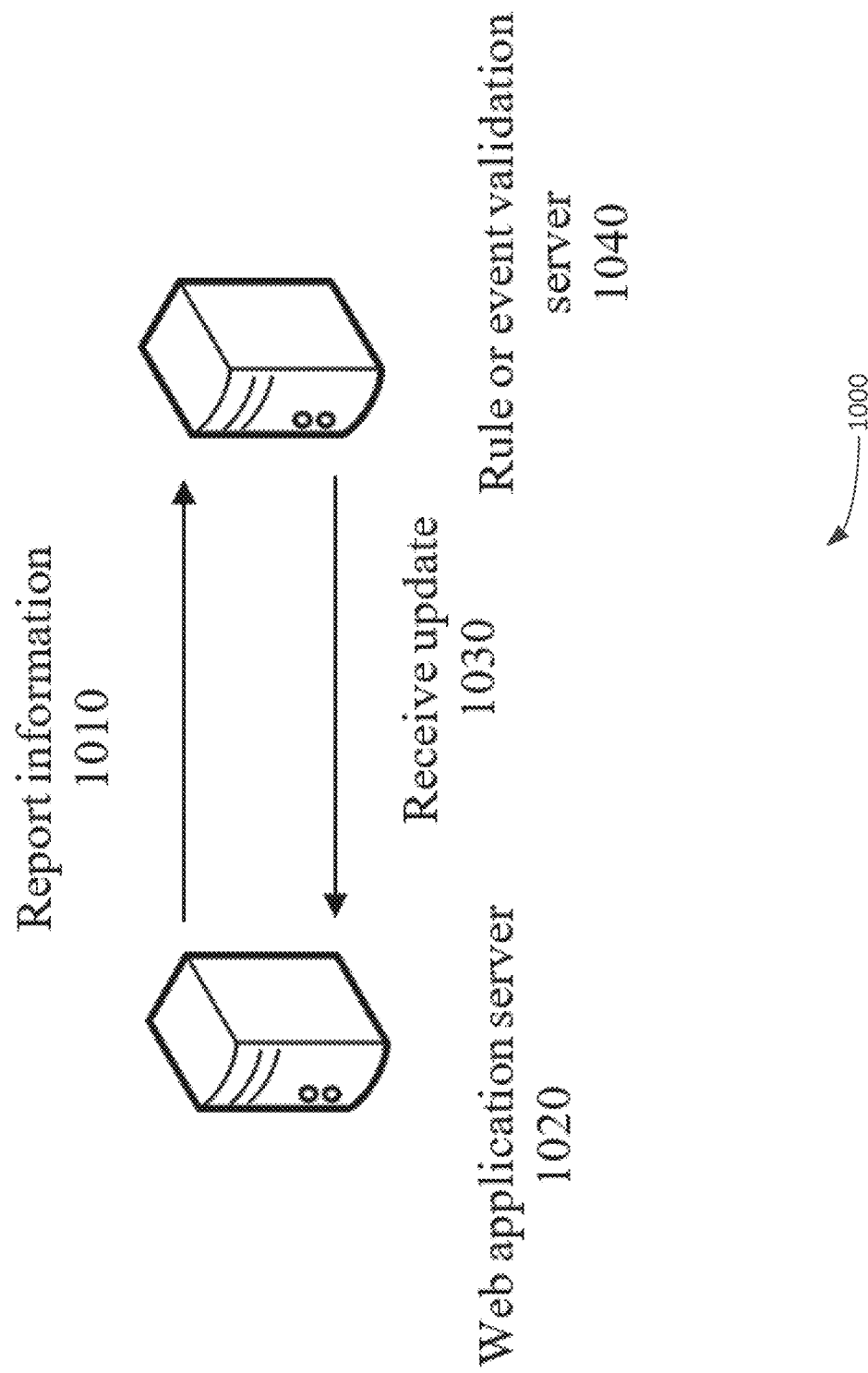
FIG. 10 illustrates an embodiment where a web application server uses a remote rule server or event validation server to improve efficiency where the web application server reports information to a remote rule server and receives updates, according to some embodiments.

FIG. 10 illustrates an embodiment 1000 in which a web application server uses a remote rule server or event validation server to improve its efficiency; the web application server 1020 reports information 1010 to a rule server 1040 and receives updates 1030. Application server efficiency can be improved by sharing information with other web application servers to prevent duplication of effort. For example, the scanning of dynamic language files and subsequent generation of static rules can consume significant computing resources and take a long time to complete. A group of web application servers can collectively improve their efficiency if the first web application server to encounter a given dynamic language file reports scan information along with the statically-generated rule list for that file. Based on the unique attributes of dynamic language files, subsequent web application servers may first query the rule server to determine whether needed rule lists exist before beginning to perform analysis of target dynamic language files to generate rules. If the rules for the target script file are already available at the rule server, they are transmitted to the web application server, which will then not have to spend resources performing the scan itself. In addition to reducing resource consumption at the web application server, the instant availability of a rule list also dramatically reduces the initial delay in protecting the web application from attack. As additional rules are generated by web application servers performing dynamic analysis for event validation, they are added to the statically-generated rules which resulted from the initial scan. The web application servers share these rules by periodically sending updates to the rule server. The rule server adds the new rules to the rule set for the relevant dynamic language file. The web application server receives updates from the remote rule server, including new rules for validating API calls made by script files, notifications when an attack is detected, and corrective actions to take for detected attacks. For greater scalability and efficiency, the task of event validation can be offloaded from the web application server to the rule server or another server. The web application server reports observed events to the remote server. The event contains sufficient information about the API call and the web request so that the remote rule server can validate it to detect an attack. The remote server 840 validates the events and sends the result along with the default action to the web application server 820.

Figure 11:
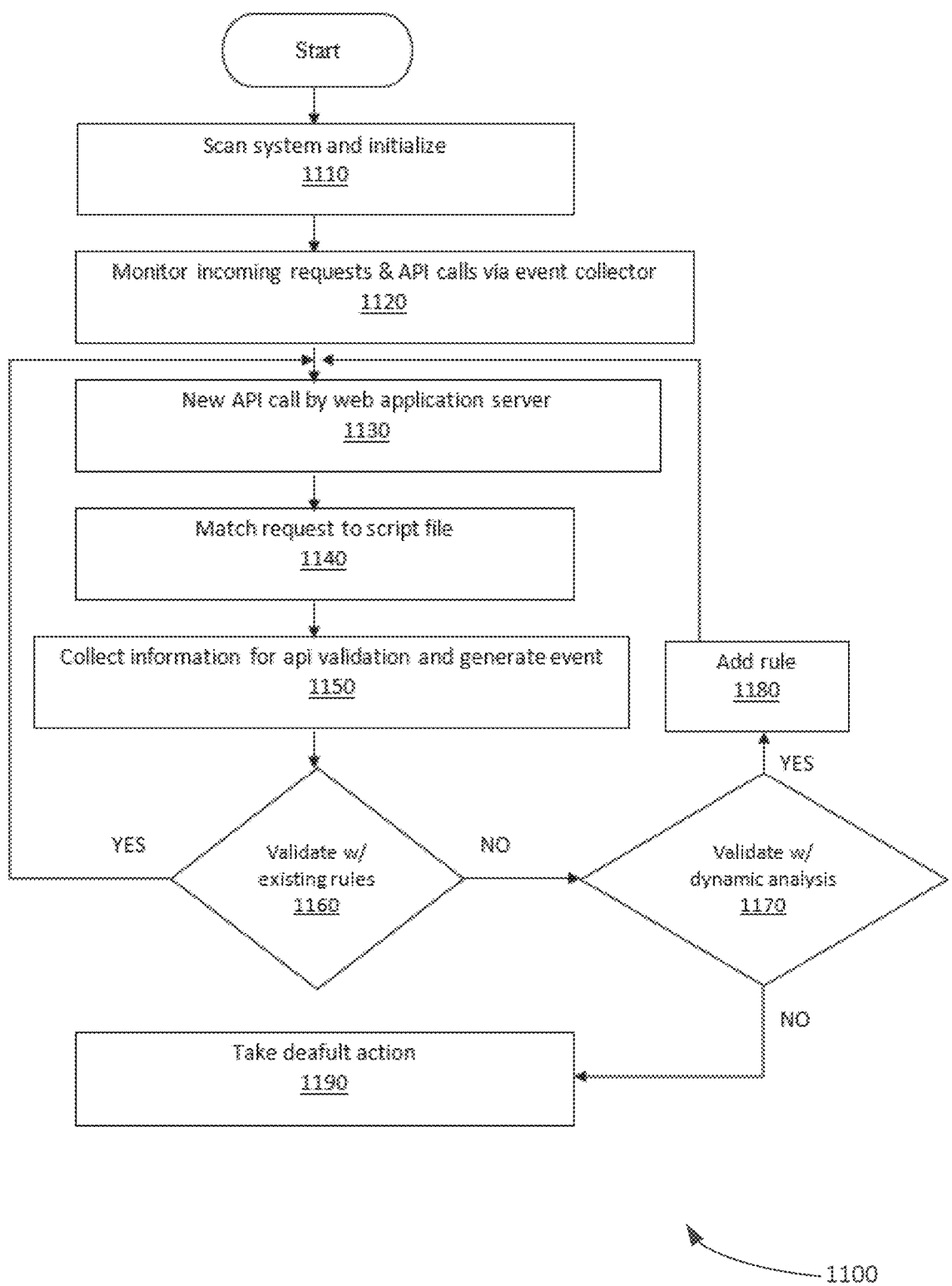
FIG. 11 is a flow chart that illustrates the process for protecting a web application server from attacks by monitoring the API calls made by the web application and validating them with the precise location in the script file responsible for the API calls, according to some embodiments.

FIG. 11 is a flowchart 1100 that illustrates the process for protecting a web application server from attacks by monitoring the API calls made by the web application and validating them with the precise location in the script file responsible for the API calls. A benefit of this approach is that attack detection based on API validation is deterministic in nature, and reduces the false positives that arise when the actions of the web application server, i.e., actions of all script files collectively, are used to determine if there is an attack. While the illustration shows all processing of API validation for attack detection done locally at the web application server, parts of the processing can be done at a remote server.

The attack detection process scans the web application server to detect the web application to be protected and performs the steps required for protecting the web application. As part of the initialization all constituent files of the web application are scanned to build the rule list 1110 and hooks are placed to monitor the API calls made by the web application, and in order to generate the events that will be used to validate the API call. The hooks are part of an event collector mechanism. Once the hooks are in place, the event collection process starts monitoring incoming requests to and API calls made by the web application for serving requests 1120.

When an API call is made by the web application 1130, the event collector process matches the request to the script file responsible for the API call. The match is achieved either via collecting the runtime stack of the web application or via a lookup table that associates an incoming web request to a script file 1140. The event collector gathers additional information that may be required for validating the observed API call and generates an event 950. The additional information may include, but is not limited to, the parameters for the web request, authentication status of the initiator of the web request, API call parameters, application stack, etc. Collected information is packaged as an event that holds information sufficient to validate the observed API call.

The generated event is validated by the event validator process, but it can also be validated by the event generator process or by a remote rule server process. The validation process processes the events. The first step in validation is to use the existing rules 1160 to validate the event. The validation of the event is done in two steps. In the first step, the rules for the script file responsible for the API call are looked up. To be valid the observed location of the API call, memory address or line number, as well as the type of API call must match with an existing rule. For certain types of API calls the validation may further require corroboration of additional details. For example, if the API is executing a SQL query, then the SQL command, as well as the number of tokens in the command must match. If the API call is executing a new process for the web application, then the process name must match. Such additional constraints are specified per API call as part of the rules.

Returning to FIG. 4, FIG. 4 shows rule list 450 where, for any given script file, the API call details are specified. The API call, script file name, line number, and any additional details in the event must match with a rule in order for the event to be validated. If the event is successfully validated, it is marked as valid and the event validator process goes on to the event from the next API call.

If the observed event does not match an existing rule, the dynamic validation method is applied 1170. The reason for dynamic validation is that often it is not possible to extract all information necessary for validating events from the script file. This is a fundamental limitation of static parsing of data. Dynamic analysis for event validation is based on generating correct rules without the influence of the attacker. For the event and the API calls that are part of that event, the effect of user input on execution of the calls is negated to obtain a rule. FIG. 9 shows the steps performed for a SQL query API call to obtain the rule. The effect of input from user (or attacker) is removed from the components of the API call. In this case the input from the user was influencing the query string sent to the database 922. A rule is created for that API call 932 and the current API call is validated against that rule. The common component for all rules is file name, line number, and API call. Then there are components that must be matched for each API call. For the query API call the validation requires that are matched the database command (db_command) as well as the tokens in the query. If the event is validated a new rule is added 1180 and the event validator process starts processing the next API call event. If the event validation fails, a rule can still be added, and the event validator process takes a default action. The default action could be terminating the web request, preventing the API call, shutting down the web application, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A method for preventing attacks on a web application server by monitoring and validating the application programming interface (API) calls executed by the dynamic language code of web application, comprising the steps of:
    scanning the computer system for web applications and the location of dynamic language code and script files used by the web applications;
    parsing all script files to identify API calls, the location of API calls, and arguments used in the API calls and storing them as rules;
    inserting hooks for monitoring incoming requests and API calls executed by the web application server;
    inserting validation code that validates the API calls executed by the dynamic language code in a script file by matching them against a rule set for that script file;
    generating an event at the time of an API call with information about the API call, arguments used in the API call, parameters of the web request, application stack, and script file responsible for the API call; and
    with the validation code:
        checking conformity of the API call's event with the rule set for the script as determined by the mapping,
        applying a dynamic validation method if a matching rule is not found, and
        taking a default action when a rule violation is detected for an event associated with an API call during the execution of the dynamic language code.

2. The method of claim 1, wherein the executable dynamic language code is a script executed by the web application server.

3. The method of claim 1, wherein the frames in the application stack are analyzed to determine the dynamic language file and the precise location in the file responsible for invoking the API call.

4. The method of claim 1, wherein an observed API call event is reported to a rule server and the corresponding rule is received.

5. The method of claim 1, wherein an observed API call is verified by matching the location and type of API call with a rule for the dynamic language code file.

6. The method of claim 1, wherein an observed API call is validated by verifying the arguments used in the API call with those specified in the rule.

7. The method of claim 1, wherein a rule list is downloaded from a rule server and used for validating API calls executed by the dynamic language code.

8. The method of claim 1, wherein the validation code executes at a remote location.

9. The method of claim 1, wherein additional information about the system state is reported to the rule server.

10. The method of claim 1, wherein the collected events are validated in a monitoring mode to build rule set.

* * * * *